United States Patent
van der Made

(10) Patent No.: US 7,093,239 B1
(45) Date of Patent: Aug. 15, 2006

(54) COMPUTER IMMUNE SYSTEM AND METHOD FOR DETECTING UNWANTED CODE IN A COMPUTER SYSTEM

(75) Inventor: Peter A. J van der Made, Elandra (AU)

(73) Assignee: Internet Security Systems, Inc., Atlanta, GA (US)

( * ) Notice: Subject to any disclaimer, the term of this patent is extended or adjusted under 35 U.S.C. 154(b) by 0 days.

(21) Appl. No.: 09/642,625

(22) Filed: Aug. 18, 2000

Related U.S. Application Data

(60) Provisional application No. 60/218,489, filed on Jul. 17, 2000.

(51) Int. Cl.
G06F 9/44 (2006.01)
G06F 11/30 (2006.01)
G06F 12/14 (2006.01)

(52) U.S. Cl. .......................... 717/135; 713/200; 714/38
(58) Field of Classification Search ................ 717/134, 717/135, 124, 126, 131; 713/187, 188, 200; 714/37, 38
See application file for complete search history.

(56) References Cited

U.S. PATENT DOCUMENTS

| | | | |
|---|---|---|---|
| 4,400,769 A | 8/1983 | Kaneda et al. | |
| 4,819,234 A | 4/1989 | Huber | |
| 4,975,950 A | 12/1990 | Lentz | |
| 5,121,345 A | 6/1992 | Lentz | |
| 5,278,901 A | 1/1994 | Shieh et al. | |
| 5,345,595 A | 9/1994 | Johnson et al. | |
| 5,359,659 A * | 10/1994 | Rosenthal | 713/200 |
| 5,398,196 A | 3/1995 | Chambers | 364/580 |
| 5,414,833 A | 5/1995 | Hershey et al. | |
| 5,440,723 A | 8/1995 | Arnold et al. | |
| 5,452,442 A * | 9/1995 | Kephart | 714/38 |
| 5,475,839 A | 12/1995 | Watson et al. | |
| 5,511,184 A * | 4/1996 | Lin | 710/261 |
| 5,586,260 A | 12/1996 | Hu | |
| 5,590,331 A | 12/1996 | Lewis et al. | |
| 5,606,668 A | 2/1997 | Shwed | |
| 5,623,600 A | 4/1997 | Ji et al. | |
| 5,623,601 A | 4/1997 | Vu | |

(Continued)

FOREIGN PATENT DOCUMENTS

EP  0 636 977 A2  2/1995

(Continued)

OTHER PUBLICATIONS

Li Gong, "Java™ Security Architecture (JDK1.2)," Oct. 2, 1998, Sun Microsystems, Inc., Version 1.0, pp. i-iv, 1-62.*

(Continued)

*Primary Examiner*—Todd Ingberg
*Assistant Examiner*—Eric B. Kiss
(74) *Attorney, Agent, or Firm*—King & Spalding LLP

(57) ABSTRACT

An automated analysis system detects malicious code within a computer system by generating and subsequently analyzing a behavior pattern for each computer program introduced to the computer system. Generation of the behavior pattern is accomplished by a virtual machine invoked within the computer system. An initial analysis may be performed on the behavior pattern to identify infected programs on initial presentation of the program to the computer system. The analysis system also stores behavior patterns and sequences with their corresponding analysis results in a database. Newly infected programs can be detected by analyzing a newly generated behavior pattern for the program with reference to a stored behavior pattern to identify presence of an infection or payload pattern.

34 Claims, 6 Drawing Sheets

U.S. PATENT DOCUMENTS

| | | | |
|---|---|---|---|
| 5,630,061 A | 5/1997 | Richter et al. | |
| 5,649,095 A | 7/1997 | Cozza | |
| 5,675,711 A | 10/1997 | Kephart et al. | 395/22 |
| 5,696,822 A | 12/1997 | Nachenberg | 380/4 |
| 5,761,504 A | 6/1998 | Corrigan et al. | |
| 5,764,887 A | 6/1998 | Kells et al. | |
| 5,764,890 A | 6/1998 | Glasser et al. | |
| 5,765,030 A | 6/1998 | Nachenberg et al. | |
| 5,774,727 A | 6/1998 | Walsh et al. | |
| 5,787,177 A | 7/1998 | Leppek | |
| 5,796,942 A | 8/1998 | Esbensen | |
| 5,798,706 A | 8/1998 | Kraemer et al. | |
| 5,815,574 A | 9/1998 | Fortinsky | |
| 5,822,517 A * | 10/1998 | Dotan | 713/200 |
| 5,826,013 A | 10/1998 | Nachenberg | |
| 5,828,833 A | 10/1998 | Belville et al. | |
| 5,832,208 A | 11/1998 | Chen et al. | |
| 5,832,211 A | 11/1998 | Blakley, III et al. | |
| 5,835,726 A | 11/1998 | Shwed et al. | |
| 5,838,903 A | 11/1998 | Blakely, III et al. | |
| 5,842,002 A | 11/1998 | Schnurer et al. | |
| 5,854,916 A | 12/1998 | Nachenberg | |
| 5,857,191 A | 1/1999 | Blackwell, Jr. et al. | |
| 5,864,665 A | 1/1999 | Tran | |
| 5,864,803 A | 1/1999 | Nussbaum | 704/232 |
| 5,872,978 A | 2/1999 | Hoskins | |
| 5,875,296 A | 2/1999 | Shi et al. | |
| 5,881,236 A | 3/1999 | Dickey | |
| 5,884,033 A | 3/1999 | Duvall et al. | |
| 5,907,834 A | 5/1999 | Kephart et al. | 706/20 |
| 5,950,012 A | 9/1999 | Shiell et al. | |
| 5,964,839 A | 10/1999 | Johnson et al. | |
| 5,964,889 A | 10/1999 | Nachenberg | |
| 5,978,917 A | 11/1999 | Chi | |
| 5,983,270 A | 11/1999 | Abraham et al. | |
| 5,983,348 A | 11/1999 | Ji | |
| 5,987,606 A | 11/1999 | Cirasole et al. | |
| 5,987,610 A * | 11/1999 | Franczek et al. | 713/200 |
| 5,987,611 A | 11/1999 | Freund | |
| 5,999,723 A | 12/1999 | Nachenberg | |
| 6,003,132 A | 12/1999 | Mann | |
| 6,014,645 A | 1/2000 | Cunningham | |
| 6,016,553 A | 1/2000 | Schneider et al. | |
| 6,021,510 A | 2/2000 | Nachenberg | |
| 6,026,442 A | 2/2000 | Lewis et al. | |
| 6,029,256 A | 2/2000 | Kouznetsov | |
| 6,035,423 A | 3/2000 | Hodges et al. | |
| 6,041,347 A | 3/2000 | Harsham et al. | |
| 6,061,795 A | 5/2000 | Dircks et al. | |
| 6,067,410 A | 5/2000 | Nachenberg | |
| 6,081,894 A | 6/2000 | Mann | |
| 6,085,224 A | 7/2000 | Wagner | |
| 6,088,803 A | 7/2000 | Tso et al. | |
| 6,092,194 A | 7/2000 | Touboul | |
| 6,094,731 A | 7/2000 | Waldin et al. | |
| 6,098,173 A | 8/2000 | Elgressy et al. | |
| 6,108,799 A | 8/2000 | Boulay et al. | |
| 6,118,940 A | 9/2000 | Alexander, III et al. | |
| 6,119,165 A | 9/2000 | Li et al. | |
| 6,119,234 A | 9/2000 | Aziz et al. | |
| 6,122,738 A | 9/2000 | Millard | |
| 6,154,844 A | 11/2000 | Touboul et al. | |
| 6,167,520 A | 12/2000 | Touboul | |
| 6,199,181 B1 | 3/2001 | Rechef et al. | |
| 6,266,774 B1 | 7/2001 | Sampath et al. | |
| 6,272,641 B1 | 8/2001 | Ji | |
| 6,275,938 B1 | 8/2001 | Bond et al. | |
| 6,324,627 B1 | 11/2001 | Krichoff et al. | |
| 6,338,141 B1 | 1/2002 | Wells | |
| 6,357,008 B1 | 3/2002 | Nachenberg | |
| 6,397,242 B1 | 5/2002 | Devine et al. | |
| 6,405,318 B1 | 6/2002 | Rowland | |
| 6,775,780 B1 | 8/2004 | Muttik | |
| 2002/0083334 A1 * | 6/2002 | Rogers et al. | 713/200 |

FOREIGN PATENT DOCUMENTS

| | | |
|---|---|---|
| WO | WO 99/15966 | 4/1999 |
| WO | WO 00/54458 | 9/2000 |
| WO | WO 01/84285 | 11/2001 |
| WO | WO 02/06928 | 1/2002 |
| WO | PCT/US01/26804 | 3/2002 |
| WO | WO 02/056152 | 7/2002 |

OTHER PUBLICATIONS

"Softworks Limited VBVM Whitepaper," [online] Nov. 3, 1998 [accessed Mar. 19, 2003], Retrieved from Internet <URL: http://web.archive/org/web/19981203105455/http://softworksltd.com/vbvm.html>, pp. 1-4.*

"Advanced Virus Detection Technology for the Next Millennium," Aug. 1999, Network Associates, A Network Associates Executive White Paper, pp. 1-14.*

"Enterprise-Grade Anit-Virus Automation in the 21st Century," Jun. 2000, Symantec, Technology Brief, pp. 1-17.*

Jeffrey O. Kephart, et al., "Blueprint for a Computer Immune System," [online] 1997 [accessed Oct. 6, 2003], Retrieved from Internet <URL: http://www.research.ibm.com/antivirus/SciPapers/Kephart/VB97/>, pp. 1-15.*

Baudouin Le Charlier, et al., "Dynamic Detection and Classification of Computer Viruses Using General Behavior Patterns," 1995, Proceedings of the Fifth International Virus Bulletin Conference, Boston, pp. 1-22.*

Robert Richardson, "Enterprise Antivirus Software," [online] Feb. 2000 [accessed Oct. 6, 2003], Retrieved from Internet <URL: http://www.networkmagazine.com/article/NMG20000426S0006>, pp. 1-6.*

"Understanding and Managing Polymorphic Viruses," 1996, Symantec, The Symantec Enterprise Papers, vol. XXX, pp. 1-13.*

Efrem G. Mallach, "On the Relationship Between Virtual Machines and Emulators," 1973, Proceedings of the workshop on virtual computer systems, Cambridge, Massachusetts, pp. 117-126.*

"Microsoft® Computer Disctionary," 2002, Microsoft Corporation, 5th ed., pp. i, ii, 567-571.*

Paul Sanna, et al., "Special Edition Using Windows NT Workstation 4.0, Second Edition," 1997, Que Corporation, pp. iii, iv, 280-296;673.*

"vnware™ for Linux," product brief, online [archived May 8, 1999], Retrieved from Internet <URL: http://web.archive.org/web/19990508224129/wwww3.vmware.com/pdf/vmwareforlinux.pdf>, pp. 1-2.*

Frans Veldman, "Heuristic Anti-Virus Technology," Proceedings, 3rd International Virus Bulletin Conference, pp. 67-76, Sep. 1993.

Symantec, Understanding Heuristics: Symantec's Bloodhound Technology, Symantec White Paper Series, vol. XXXIV, pp. 1-14, Sep. 1997.

Carey Stover Nachenberg, "A New Technique for Detecting Polymorphic Computer Viruses," A thesis submitted in partial satisfaction of the requirements for the degree Master of Science in Computer Science, University of California Los Angeles, pp. I-27, 1995.

Andrew P. Kosoresow, et al., "Intrusion Detection Via System Call Traces," IEEE Software, pp. 35-42, Sep./Oct. 1997.

"Microsoft P-Code Technology," http://msdn.microsoft.com/archive/default.asp?url=/archive/en-us/dnarvc/html/msdn_c7pcode2.asp, pp. 1-6, Apr. 1992.

"DJGPP COFF Spec," http://delorie.com/digpp/doc/coff/, pp. 1-15, Oc. 1996.

Natvig, Kurt, "Sandbox Technology Inside AV Scanners," Virus Bulletin Conference, Sep. 2001, pp. 475-488.

"Norman introduces a new technique for eliminating new computer viruses," found on Norman's website, file://C:\Documents%20and%20Settings\7489\Local%20Settings\Temporary%20Internet%20Files\OLK, pp. 1-2, published Oct. 25, 2001, printed from website Dec. 27, 2002.

Lee et al., "A Generic Virus Detection Agent on the Internet," System Sciences, 1997, Proceedings of the Thirtieth Hawaii International Conference on Wailca, HI, Jan. 7-10, 1997, pp. 210-219, #XP010271868.

International Search Report for PCT/US01/19142, international filing date Jun. 14, 2001, mailing date Jan. 17, 2003.

Kephart, "A Biologically Inspired Immune System for Computers," Artificial Life, IV, 1994, pp. 130-139.

* cited by examiner

COMPUTER IMMUNE SYSTEM AND METHOD FOR DETECTING UNWANTED CODE IN A COMPUTER SYSTEM

PRIORITY APPLICATION NOTICE

This application claims priority from U.S. provisional patent application Ser. No. 60/218,489, filed Jul. 17, 2000, which application is hereby incorporated by reference in its entirety.

BACKGROUND OF THE INVENTION

1. Field of the Invention

The present invention relates to the field of computer security and specifically to the detection of computer programs that exhibit malicious or self-propagating behavior including, for example, computer viruses and trojans.

2. Discussion of the Related Art

Detection of viruses has been a concern throughout the era of the personal computer. With the growth of communication networks such as the Internet and increasing interchange of data, including the rapid growth in the use of e-mail for communications, the infection of computers through communications or file exchange is an increasingly significant consideration. Infections take various forms, but are typically related to computer viruses, trojan programs, or other forms of malicious code. Recent incidents of e-mail mediated virus attacks have been dramatic both for the speed of propagation and for the extent of damage, with Internet service providers (ISPs) and companies suffering service problems and a loss of e-mail capability. In many instances, attempts to adequately prevent file exchange or e-mail mediated infections significantly inconvenience computer users. Improved strategies for detecting and dealing with virus attacks are desired.

One conventional technique for detecting viruses is signature scanning. Signature scanning systems use sample code patterns extracted from known malicious code and scan for the occurrence of these patterns in other program code. In some cases program code that is scanned is first decrypted through emulation, and the resulting code is scanned for signatures or function signatures. A primary limitation of this signature scanning method is that only known malicious code is detected, that is, only code that matches the stored sample signatures of known malicious code is identified as being infected. All viruses or malicious code not previously identified and all viruses or malicious code created after the last update to the signature database will not be detected. Thus, newly created viruses are not detected by this method; neither are viruses with code in which the signature, previously extracted and contained in the signature database, has been overwritten.

In addition, the signature analysis technique fails to identify the presence of a virus if the signature is not aligned in the code in the expected fashion. Alternately, the authors of a virus may obscure the identity of the virus by opcode substitution or by inserting dummy or random code into virus functions. Nonsense code can be inserted that alters the signature of the virus to a sufficient extent as to be undetectable by a signature scanning program, without diminishing the ability of the virus to propagate and deliver its payload.

Another virus detection strategy is integrity checking. Integrity checking systems extract a code sample from known, benign application program code. The code sample is stored, together with information from the program file such as the executable program header and the file length, as well as the date and time of the sample. The program file is checked at regular intervals against this database to ensure that the program file has not been modified. Integrity checking programs generate long lists of modified files when a user upgrades the operating system of the computer or installs or upgrades application software. A main disadvantage of an integrity check based virus detection system is that a great many warnings of virus activity issue when any modification of an application program is performed. It is difficult for a user to determine when a warning represents a legitimate attack on the computer system.

Checksum monitoring systems detect viruses by generating a cyclic redundancy check (CRC) value for each program file. Modification of the program file is detected by a variation in the CRC value. Checksum monitors improve on integrity check systems in that it is more difficult for malicious code to defeat the monitoring. On the other hand, checksum monitors exhibit the same limitations as integrity checking systems in that many false warnings issue and it is difficult to identify which warnings represent actual viruses or infection.

Behavior interception systems detect virus activity by interacting with the operating system of the target computer and monitoring for potentially malicious behavior. When such malicious behavior is detected, the action is blocked and the user is informed that a potentially dangerous action is about to take place. The potentially malicious code can be allowed to perform this action by the user. This makes the behavior interception system somewhat unreliable, because the effectiveness of the system depends on user input. In addition, resident behavior interception systems are sometimes detected and disabled by malicious code.

Another conventional strategy for detecting infections is the use of bait files. This strategy is typically used in combination with other virus detection strategies to detect an existing and active infection. This means that the malicious code is presently running on the target computer and is modifying files. The virus is detected when the bait file is modified. Many viruses are aware of bait files and do not modify files that are either too small, obviously a bait file because of their structure or have a predetermined content in the file name.

It is apparent that improved techniques for detecting viruses and other malicious types of code are desirable.

SUMMARY OF THE PREFERRED EMBODIMENTS

One aspect of the present invention provides a method for identifying presence of malicious code in program code within a computer system, including initializing a virtual machine within the computer system. The initialized virtual machine comprises software simulating functionality of a central processing unit and memory. The virtual machine virtually executes a target program so that the target program interacts with the computer system only through the virtual machine. The method includes analyzing behavior of the target program following virtual execution to identify occurrence of malicious code behavior and indicating in a behavior pattern the occurrence of malicious code behavior. The virtual machine is terminated at the end of the analysis process, thereby removing from the computer system a copy of the target program that was contained within the virtual machine.

Another aspect of the present invention provides a method for identifying the presence of malicious code in program code within a computer system. The method includes initializing a virtual machine within the computer system, the virtual machine comprising software simulating functionality of a central processing unit, memory and an operating system including interrupt calls to the virtual operating system. A target program is virtually executed within the virtual machine so that the target program interacts with the virtual operating system and the virtual central processing unit through the virtual machine. Behavior of the target program is monitored during virtual execution to identify presence of malicious code and the occurrence of malicious code behavior is indicated in a behavior pattern. The virtual machine is terminated, leaving behind a record of the behavior pattern characteristic of the analyzed target program.

DETAILED DESCRIPTION OF THE PREFERRED EMBODIMENTS

Figure 1:
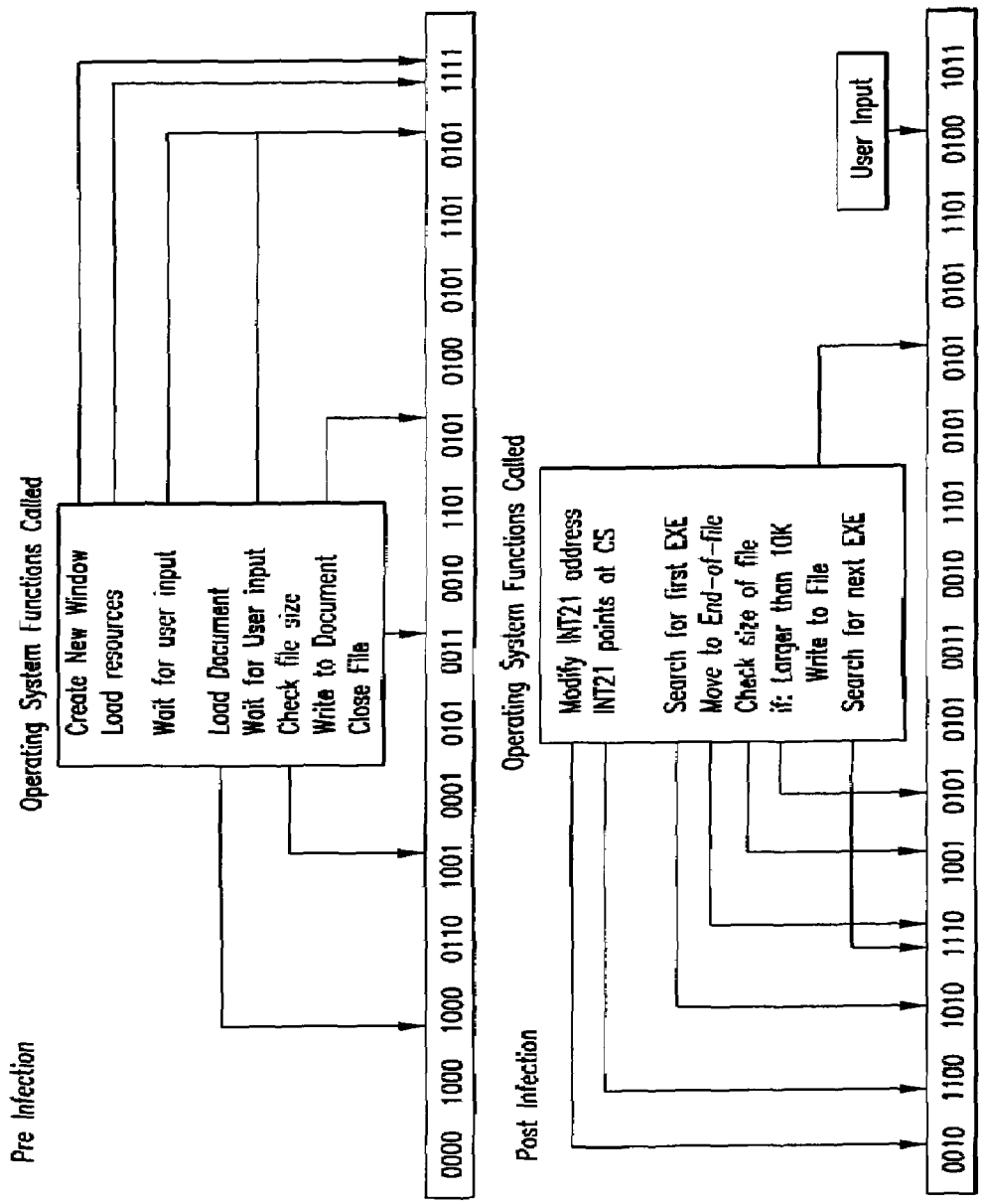
FIG. 1 illustrates a behavior pattern generated according to the analytical behavior method, showing the behavior pattern for code that is not infected and is infected with a computer virus. Each bit may be a flag indicating an action. The total stream of bits is a value indicative of the behavior of the program.

A particularly preferred embodiment of the present invention provides an automated analysis system that detects viruses and other types of malicious code within a computer system by generating and subsequently analyzing a behavior pattern for each computer program introduced to the computer system. New or modified computer programs are analyzed before being executed by the computer system. Most preferably the computer system initiates a virtual machine representing a simulation of the computer system and the virtual machine executes the new or modified computer program to generate a behavior pattern prior to the new computer program being executed by the physical computer system. An initial analysis is performed on the behavior pattern to identify infected programs upon initial presentation of the program to the computer system. The analysis system also stores behavior patterns and corresponding analysis results in a database. Newly infected programs can be detected by subtracting the stored behavior pattern for that program from a newly generated behavior pattern, and analyzing the resulting pattern to identify an infection or payload pattern associated with malicious code.

A variety of different terms are used in programming to describe different functional programming subunits. At different times and for different programming languages subunits of various sorts have been called functions, routines, subprograms, subroutines and other names. Such designations and the context or differences they represent are not significant to the present discussion and so this discussion is made simply in terms of programs, intending the term program to refer to functional programming units of any size that are sufficient to perform a defined task within a computer system or computing environment. Such specialized functions as those performed by macros within certain word processing programs, including, for example, in "VISUAL BASIC" macros for Microsoft's "WORD" documents, are included within this general discussion. In this sense, individual documents may be considered to be programs within the context of this discussion.

For convenience and brevity, this discussion references viruses in the known sense of that term as being a self-propagating program generally undesired in the infected computer system. As used here, the term "WINDOWS" is intended to reference any of the personal desktop operating systems sold by the Microsoft Corporation under the "WINDOWS" brand name. The term PC or personal computer is used, unless specifically modified to indicate otherwise, to indicate a computer system based on the well-known x86 architecture, including those machines that presently are based on the microprocessor sold by Intel Corporation under its "PENTIUM" brand name and successors to that microprocessor and architecture. This discussion is provided to illustrate implementation of aspects of the invention. Aspects of the present invention find application in a range of different computer systems in addition to the illustrated personal computer systems.

The present inventor has analyzed the behavior of a variety of different viruses and other malignant source code. Certain general characteristics of viruses have been identified. A virus needs to infect other programs and eventually other programs to propagate. Viruses consequently include infection loops that copy the virus into another executable program or sometimes into documents, in the exemplary case of "VISUAL BASIC" macro viruses. Viruses and trojans generally contain payloads. The payload allows the virus to affect the infected system or communicate its presence. A payload might be, for example, a message that pops up to announce the virus or a malicious function that damages the infected computer, for example by corrupting or erasing the data on the hard disk or by altering or disabling the BIOS within the BIOS flash or EEPROM.

Another common characteristic of viruses is that the virus becomes resident in the memory. DOS viruses need to copy themselves into memory and stay resident. Most viruses do not use the obvious terminate and stay resident (TSR) call but instead use a procedure that copies the virus into high memory. The virus then can directly modify the data in the high memory blocks. In an additional aspect of this infection scheme, the interrupt vector is modified to point at memory blocks that have been modified by the memory resident virus or other malignant procedure. These modified memory blocks store the infection procedure. Windows specific viruses bump themselves into ring0, for example using a callgate or DPMI call, and go resident in a system utility such as the system tray.

These behaviors are characteristic of a virus and are not, in the aggregate, characteristic of other, non-malignant programs. Consequently, a program can be identified as a virus or infected with a virus if it possesses certain ones of these behaviors, certain collections of these behaviors or all of these behaviors. In preferred embodiments of the present invention, the occurrence of these behaviors or combinations of the behaviors is indicated by collections of bits in a behavior pattern data set representing behavior characteristic of the infected program. An example of behavior patterns for a normal and an infected file are illustrated in FIG. 1.

In preferred embodiments of the present invention, the behavior of a newly loaded or called program is analyzed in a virtual machine that simulates a complete PC, or a sufficiently complete PC, in software and it is that virtual PC that generates the behavior pattern. The virtual PC simulates execution of the new or modified program, simulating a range of system functions, and the virtual PC monitors the behavior of the suspect program and makes a record of this behavior that can be analyzed to determine that the target program exhibits virus or malignant behaviors. The result of the virtual execution by the virtual machine is a behavior pattern representative of the new program. As discussed in greater detail below, the behavior pattern generated by the virtual PC identifies that a program is infected with a virus or is itself a virus. An advantage for the use of virtual execution and analysis of new programs for viruses is that the virtual machine is virtual and so, if the virtualized new program contains a virus, only the virtual machine is infected. The infected instance of the virtual machine is deleted after the simulation, so the infection is incomplete and the virus does not propagate. The behavior pattern survives the deletion of the virtual machine, allowing an analysis program to identify the existence of the virus and of the infection within the new program.

Most preferably, each time a new program is analyzed a new instance of the virtual machine is generated, free of modification by any previously virtualized programs including any earlier analyzed viruses. The new program then is run on the new instance of the virtual machine preferably followed by initiation of a modified interrupt caller procedure, described in greater detail below. While the virtual machine is executing the new program in cooperation with the modified interrupt caller procedure, the virtual machine monitors all system calls, DPMI/DOS interrupts and I/O port read/write (r/w) operations, setting bits in the behavior pattern register according to the observed behaviors. It is these bits in the behavior pattern that are retained after the simulation is complete and the virtual PC has been terminated. The bits stored in the behavior pattern register are the behavior pattern and indicate whether the virtually-executed program includes behaviors indicative of the presence of a virus or other malignant code.

The modified interrupt caller procedure calls the interrupts that the program being analyzed has modified within the virtual PC and generates a behavior pattern for each of those interrupt service routines as well. This allows particularly preferred embodiments of the present invention to identify certain types of viruses that initially modify only the interrupt service routines and do not begin propagating until the modified interrupt or interrupts are called by another program. By allowing the various interrupt service routines in the virtual machine to be modified and then analyzing the modified interrupts, these embodiments of the invention can detect this delayed propagation mechanism.

In some presently preferred embodiments, only the static, final version of the behavior pattern is analyzed. It is possible, and in some circumstances desirable, to monitor the sequence in which the bits in the behavior pattern register are set. The order in which the behavior pattern bits are set provides additional information allowing identification of additional virus behaviors. Tracking of the order in which the behavior pattern bits are set is accomplished within the virtual machine.

Preferred implementations of the analytical behavior method (ABM) proceed by extracting a behavior pattern and sequence from a modified, new, unknown or suspect program. The behavior pattern is preferably used to analyze the behavior of the unknown program to determine if the behavior of the unknown program is malicious. Identification of malicious behavior in this manner allows identification of virus carrying files prior to infection of the host computer system. The behavior pattern can also be stored in a database and the virtual machine can subsequently analyze the behavior of the program following modification to determine if its functionality has been modified in a suspect (malicious) manner. This provides post-infection analysis.

The described analytical behavior method differs from conventional virus detection methods in that it does not match program code to a set of stored patterns as do signature scanners and integrity checkers. Rather, a virtual machine is used to generate a behavior pattern and a sequence. The generated behavior pattern does not change significantly between version updates, but does change dramatically when a virus infects a program. For example, a word processor will still behave like a word processor when the program is replaced or updated with a new version of the program but the word processor changes significantly when the word processor is infected with a virus. The differences reflected in the behavior patterns are illustrated in FIG. 1. When a word processor is infected with a file infector computer virus, the word processor now opens executable files and inserts the viral code into them, thereby infecting additional files. This is clearly reflected in the illustrated behavior patterns.

In particularly preferred embodiments of the invention, the analysis procedure specifically targets infection methods such as, but not limited to, the insertion of code to other executables or documents, submitting code to other applications to be transmitted or stored, insertion of code into high memory blocks and the modification of memory control blocks. Preferred implementations of the analysis method further look for destructive content, such as, but not limited to, functions that overwrite disk areas or the BIOS ROM, or delete files or directories. Most preferably, the analysis makes an exception and does not identify as infected a program whose other behavior characteristics indicate that the program is a development tool or software debugging tool and where the modifying behavior is an integral part of the tool's normal function. A viral infection of a development tool can be detected where an expressed function is not part of the tool's normal function, that is, within the development process. Both active (1) and inactive (0) flags present in the behavior pattern are significant in this analysis, as well as the sequence in which actions take place.

In accordance with preferred embodiments of the present invention, the virtual machine or virtual PC represents a simulation of a complete computer system. A complete computer system preferably includes an emulated central processing unit (CPU), emulated memory, input/output (I/O)

ports, BIOS firmware, operating system and the operating system data areas. This stands in contrast to simple emulation of a processor, in which only the processor processes are emulated. In emulation, program instructions are converted from their native form to a stream of instructions that perform the same function on a different hardware platform. Some signature scanning software employs emulation to decrypt the body of a suspect program before the suspect program is scanned for signatures. In virtualization, the entire computer is simulated including operating system calls, which are not actually executed but seem to the calling program to perform the desired functions and return the correct values as if they were executed.

As discussed above, the virtual PC includes a CPU, memory, I/O ports, a program loader, and the operating system application program interface (API's) entry points and interface. Using such a complete virtual PC is particularly preferred because it gives the analytical behavior method a high level of control over the virtualized program, including over the sophisticated direct calls to the operating system API. The virtualized program is not given access to any of the facilities of the physical machine, thereby avoiding the risk that the potential virus or other malicious code escapes from the controlled environment to infect the host computer system.

Figure 2:
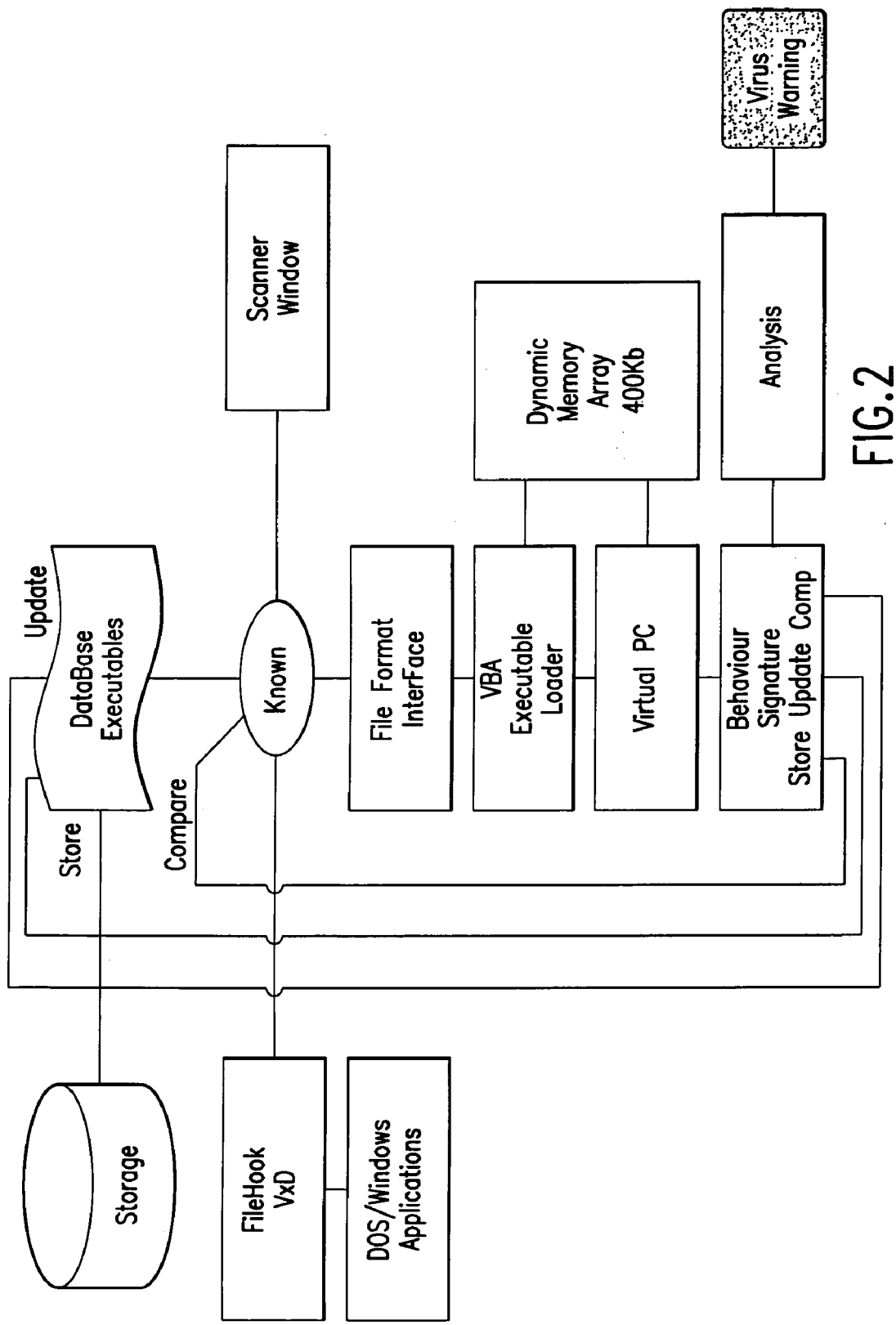
FIG. 2 shows a block diagram of components used in a preferred implementation of the analytical detection method.

FIG. 2 provides an overview of the preferred analytic behavior method architecture including the relationship between the virtual machine and components of the host computer system. Program code is delivered to the ABM engine and analysis system by direct access to the hard disk through I/O port bit manipulation, hooking into the operating system file system or by sequentially scanning the hard disk. The program code is checked against the database for 'known' files. If the file is new or modified, it is processed. The resulting behavior signature is analyzed or compared and stored. A virus warning is returned when analysis shows that the file contains malicious code. The analytical behavior method preferably includes: (1) file structure extraction; (2) change detection; (3) virtualization; (4) analysis; and (5) decision.

Before the program can be virtualized, the file format containing the target program has to be evaluated. The entry point code is extracted and loaded into the virtual computer's memory at the correct simulated offset. In a physical computer this function would be performed by the program loader function, which is part of the operating system. The operating system can execute programs that are held in a collection of different file formats, such as:

DOS 1.0 and/or CP/M COM Binary image file, loaded at 100h in memory, maximum size: 64K.

DOS 2.0–DOS 7.1 EXE MZ-type executable, header determines CS:IP of load address.

"WINDOWS" 3.0 Operating System executables NE-type executable which contains both the DOS MZ-header pointing at a DOS code area and a New Executable (NE) header containing the entry point of the "WINDOWS" Operating System (protected mode) code. NE files are segmented.

"OS/2" Operating System executables LE/LX type executable which contains both the DOS MZ-header and DOS code area and a protected mode section which is determined by the LE-header following the DOS code segment. Linear Executable (LE) files are used in the "WINDOWS" 3 Operating System for system utilities and device drivers. LE files are segmented. LX files incorporate some differences in the way the page table is stored and are intended for the "OS/2" Operating System. LE files are segmented and the segments are paged.

32-bit executables PE-type executable which contains both the DOS MZ-header and DOS code area and the Portable Executable header containing the entry point and file offset of the protected mode code. PE files are segmented.

OLE Compound Files OLE compound files (COM) are document files that can contain executable format streams, usually referred to as Macros. All "OFFICE" program components incorporate "VISUAL BASIC" code for Applications, as does "INTERNET EXPLORER" browser versions 4 and 5. 98 "WINDOWS98" operating systems can execute "VISUAL BASIC" code directly from a script file. The "VISUAL BASIC" code is compiled and stored in a stream, which is paged according to its file offset references stored in a linked list in the file header.

Binary Image A binary image is used for the boot sector and Master Boot and Partition table. Both the boot-sector and the MBR contain executable code which is loaded into memory at 0:7C00 during the start-up process.

Driver files System Drivers are stored as a binary image with a header. The header contains information about the drivers stored within the file. Multiple drivers can be stored within the same file.

The virtual computer loader function is capable of dealing with the file formats and binary image files shown above. The loader function is performed by virtualizing the operating system program loader and so varies depending on the operating system used in the host computer. The file structure analysis procedure looks in the file header and file structure to determine the file format, rather than using the file extension because file extensions are unreliable in general use. The .EXE formats described above therefore include DLL, AX, OCX and other executable file format extensions.

Figure 3:
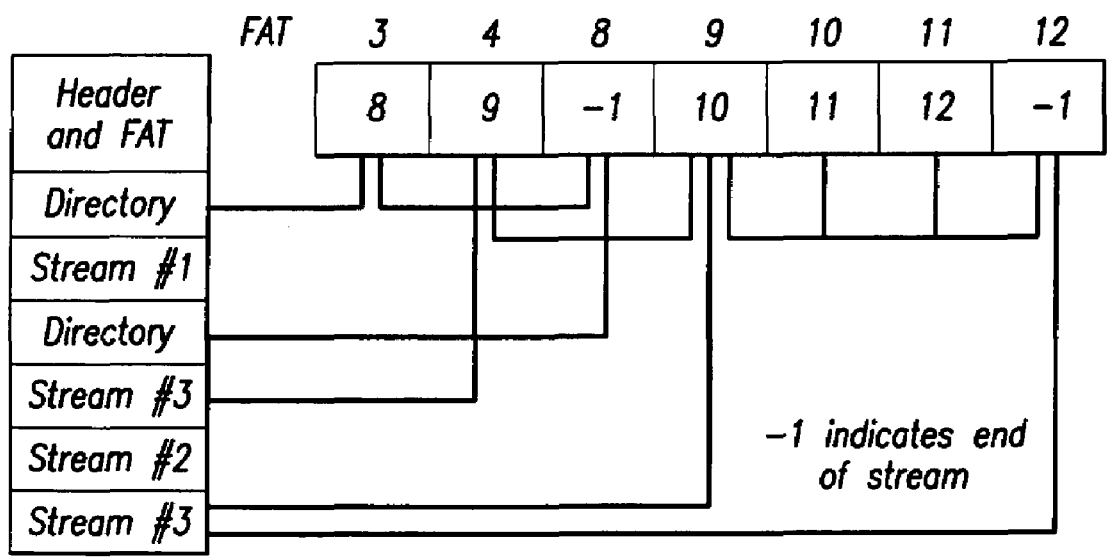
FIG. 3 schematically illustrates the COM file format, used as an example of the function of the program structure extractor and program loader.

Compound document files can contain executable streams such as "VISUAL BASIC" code or macros. The structure of a compound document file is illustrated in the diagram shown in FIG. 3. The header of a compound document file contains a linked list (or File Allocation Table) which is referenced in a directory structure that points to the entry point of the linked list. Each entry in the linked list refers to the next entry and a file offset. A value of −1 in the linked list indicates the end of a chain. Streams exist out of blocks, which may be scattered anywhere in the file in any order. In particularly preferred embodiments of the invention, code extracted from a compound document file is passed through a "VISUAL BASIC" decompiler before it is presented to a "VISUAL BASIC" emulator. Not all compound document files contain compiled "VISUAL BASIC" code. Hypertext markup language (HMTL) and "VISUAL BASIC" Script (VBS) files can contain "VISUAL BASIC" Script code as text. This code is preferably extracted and treated as a "VISUAL BASIC" Script code as text. This code is preferably extracted and treated as a "VISUAL BASIC" code stream within the virtual machine.

Figure 4:
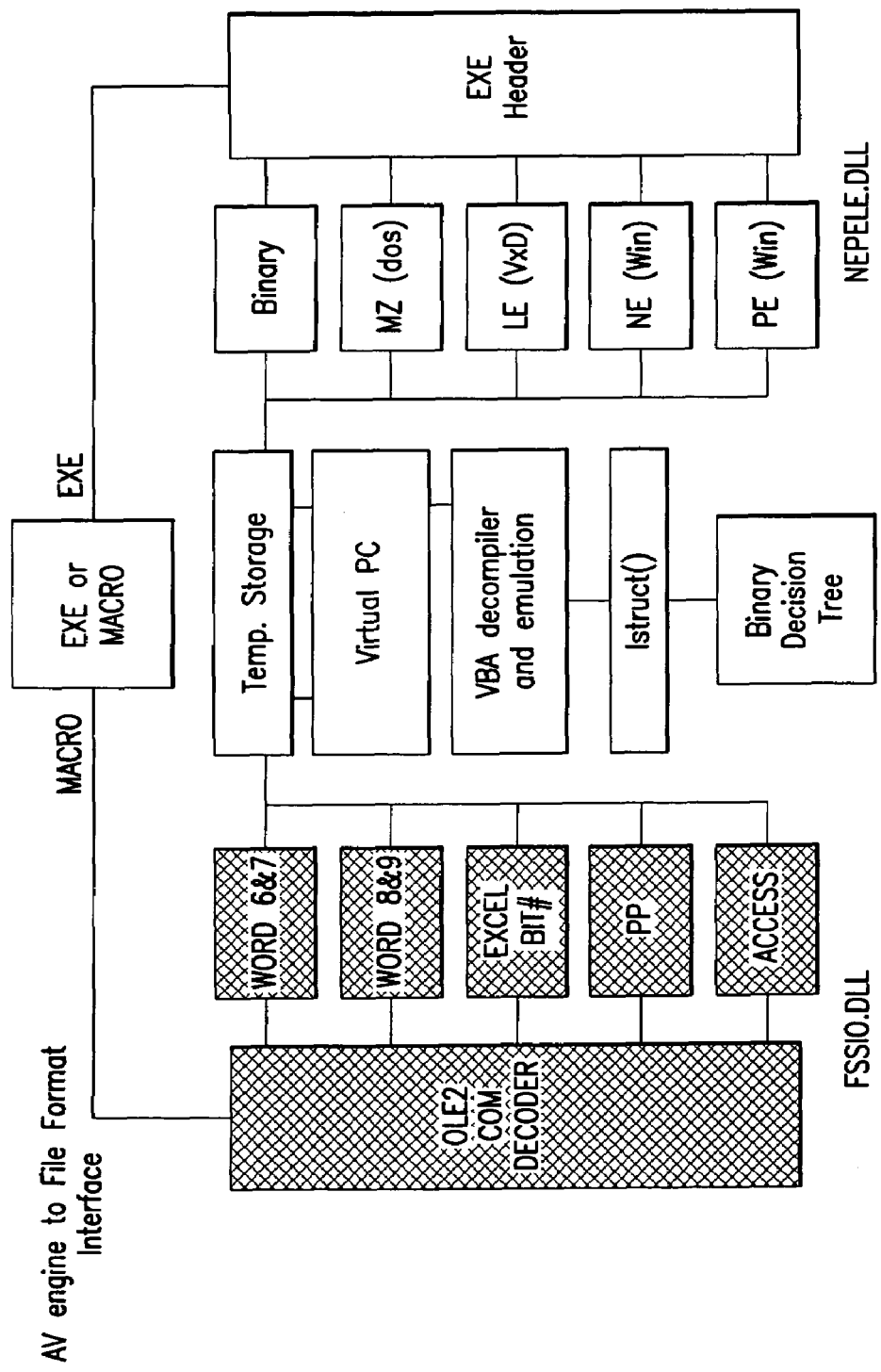
FIG. 4 illustrates an interface of the virtual PC to various program file formats. Before virtualization can take place, the program loader preferably extracts the correct entry point, code and initialized data from the program file. The file offset to the entry point code is given in the program header and varies depending on the type of file that contains the program.

The NE /PE /LE executable file formats are similar in complexity, except that no linked list is used; rather these file formats use a segment or page table. The PE file format is based on the COFF file specification. FIG. 4 illustrates how these file formats interface with the preferred virtual PC in accordance with certain embodiments of the present invention. In evaluating how aspects of the preferred virtual PC interfaces to a particular file, the file loader preferably decides if the file presented is a document file or a binary file.

After the file format has been evaluated and the entry point-file offset has been calculated, the file is opened and the virtual machine reads the relevant code into memory as a data stream. The length of the code is calculated from fields in the header of the file. This information is passed to the virtual program loader. The virtual program loader uses information in the file header to load the extracted code at the correct simulated offset in a virtual memory array.

A memory mapping utility maps the virtual memory map to the offset for the file type that is virtualized:
DOS (CP/m) binary image files (.COM) offset CS:100h
DOS (2.0 up) Executable format files (MZ-EXE) offset CS:IP from header
Windows NE, PE, LE offset C0000000+CS:IP from header
Binary Image MBR, Boot sector code offset 0:7C00h
Document COM files, HTML and VBS files no specific offset, VBA code The Loader utility dynamically assigns physical memory to the virtual computer memory array each time a program is virtualized, and proceeds to build a new virtual machine. Each virtual machine contains a BIOS data area, a filled environment string area, DOS data area, memory control blocks, program segment prefix area, the interrupt vector table and descriptor tables. The final structure of the virtual machine depends on the type of program that is virtualized. Each virtualized program therefore runs in a fresh memory area, created when that program is loaded into the virtual PC. Previous instances, where infected programs may have been virtualized, therefore cannot affect the performance of subsequent programs. The virtual machine is shut down and its memory resources are released when the virtualized program terminates and the virtual machine completes assembly of the behavior pattern for the target, virtualized.

Figure 5:
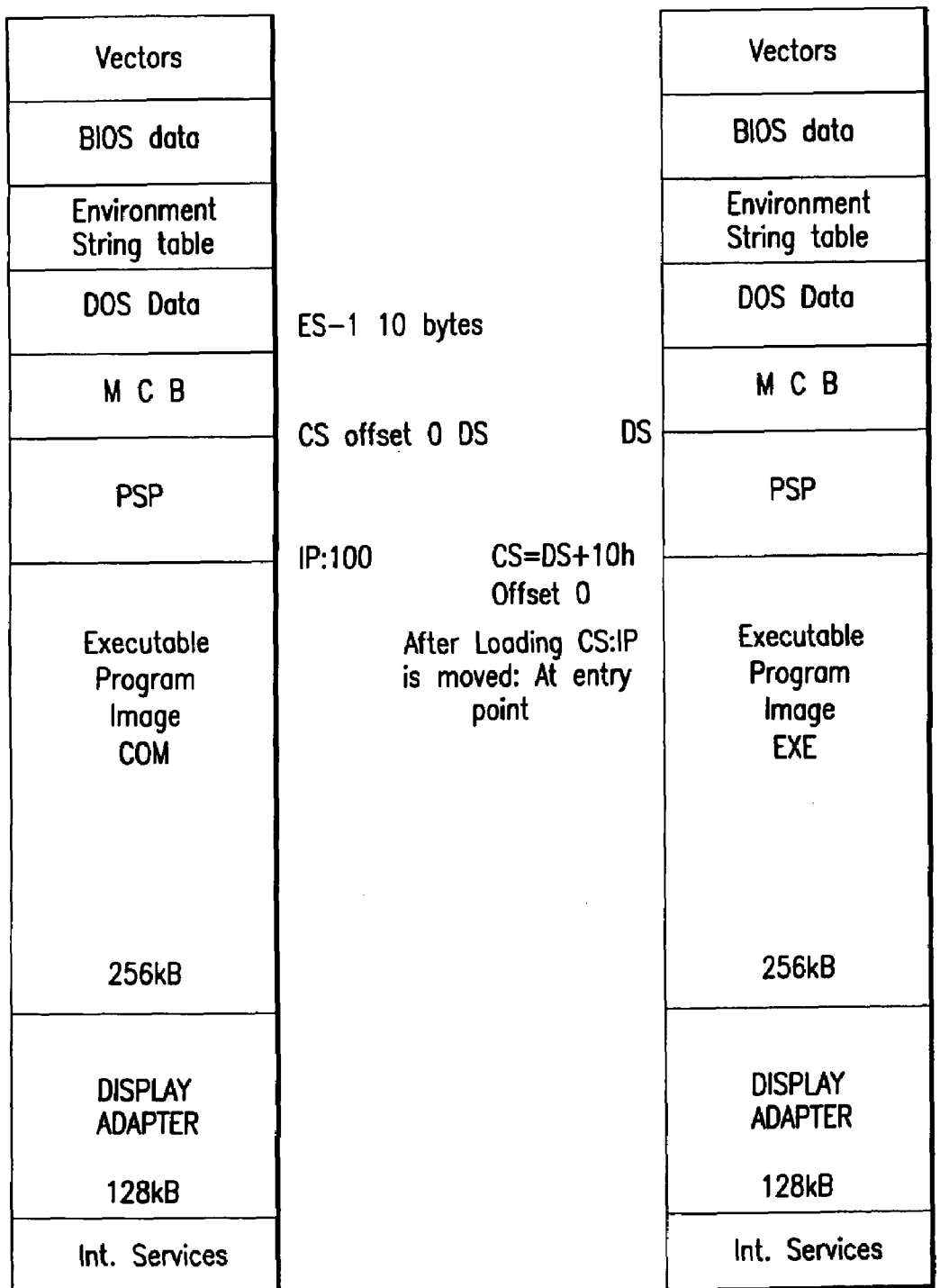
FIG. 5 schematically illustrates the virtual PC memory map after loading a binary image (.COM) program and after loading a MZ-executable program. To virtualize the code in the desired manner, the structure of the virtual PC and its memory map contains the same information as it would if the code was executed on the physical PC which runs the virtual machine containing the Virtual PC.

FIG. 5 illustrates how the virtual memory is configured for (COM) binary image files and DOS program (MZ-EXE) files. The memory map and mapper utility are adjusted depending on the file type.

The program loader simulates the loader functions of the operating system and creates system areas that represent similar system areas in the physical computer. This is particularly advantageous functionality because the code under evaluation most preferably runs in the same manner as if executed on a physical computer system. The virtualized program is executed by fetching instructions from the virtual memory array into a pre-fetch instruction queue. The instructions in the queue are decoded and their length is determined by their operational parameters.

The instruction pointer is incremented accordingly so that the instruction loader is ready to fetch the next instruction. The virtual machine determines from the r/m field of the instruction parameters where data on which the instruction operates is to be fetched. The data fetch mechanism fetches this data and presents the data to the logic unit, which then performs the operation indicated by the code. The destination of the processed data is determined from the parameters of the instruction code. The data write mechanism is used to write the processed data to emulated memory or the emulated processor register set. This process accurately reflects what takes place in a physical CPU (central processing unit).

Figure 6:
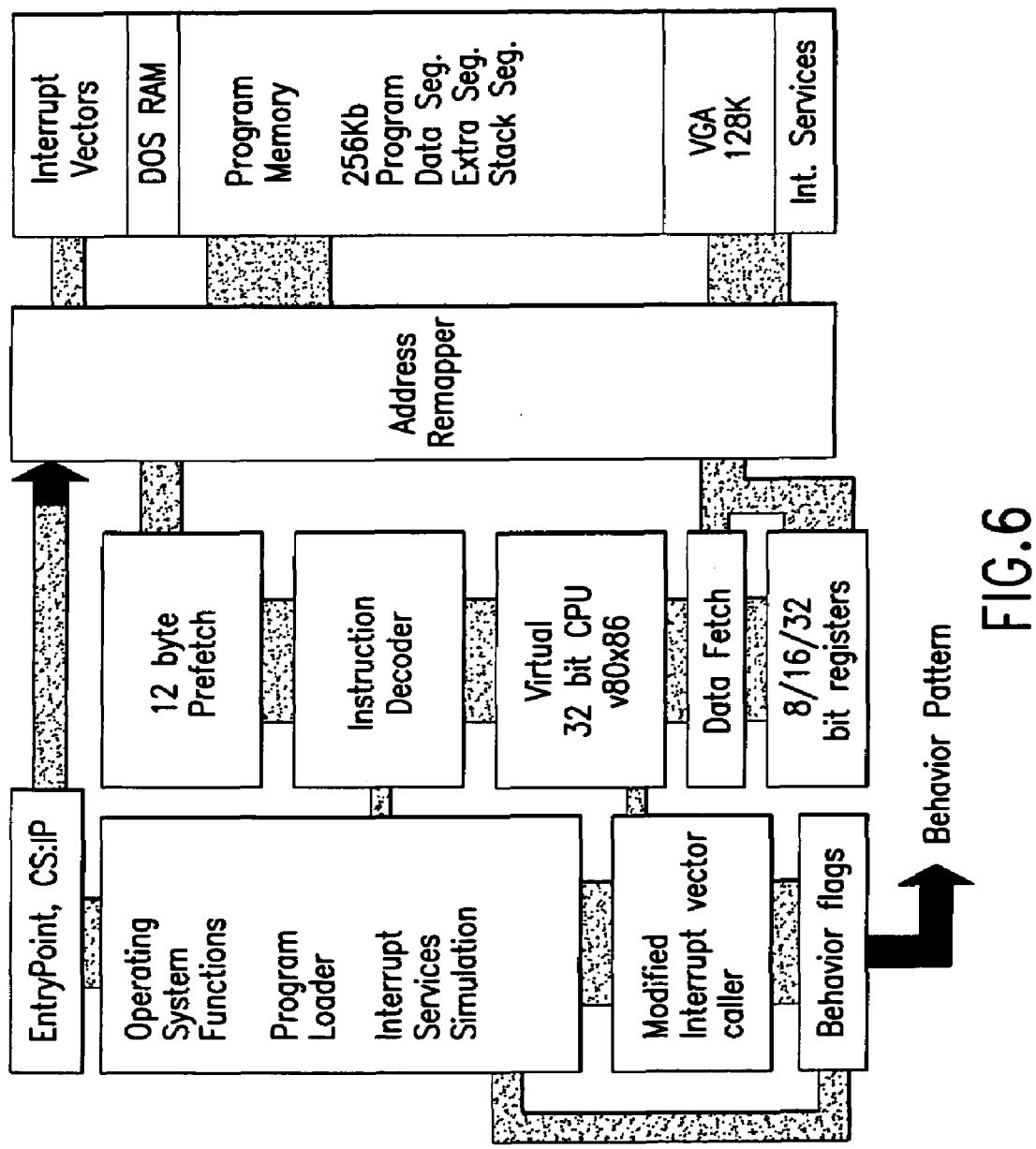
FIG. 6 provides a detailed diagram showing components of a preferred implementation of the Virtual PC. The virtual PC contains the same components that are used in a physical computer, except that all Virtual PC components are simulated in software running as a virtual machine on a physical computer.

All areas of this process are simulated, as generally illustrated in FIG. 6. The memory exists as an array of 400 Kbyte elements into which all memory accesses are mapped by a memory mapping mechanism. The size of the memory array may be adjusted in future implementations to accommodate larger programs. The video display is simulated from a system viewpoint as 128 Kbyte of memory mapped between A000:0 and BFFF:F (inclusive) in the virtual computer's memory map. The standard IBM PC input/output area is simulated as an array of 1024 bytes representing I/O ports 0-3FFh. The CPU is simulated by performing the same low-level functions as the physical CPU, but in high-level software.

The operating system is implemented as an area in the memory array of 700h bytes containing the BIOS data fields, the DOS data area, Memory Control Blocks and DOS devices. The interrupt vector table takes up the first 1024 (400h) positions in the memory array as it would in a physical PC. The DOS interrupt structure is implemented as simulated functions that return the correct values and by filling the memory array with the correct values expected by simulating DOS functions.

The operating system is implemented as a virtual API (VAPI) that simulates the results returned by all operating system API's.

During the virtualization process, flags are set in the behavior pattern (Tstruct) field as the functions represented by those fields are virtualized. The sequence in which these functions are called is recorded in the sequencer. The behavior pattern therefore matches closely the behavior of the program under evaluation to the behavior of that program in a physical PC environment. Simulated interrupt vectors modified during the process of executing the virtualized program are called after program virtualization terminates, thus acting as applications that would call such interrupt vectors in a physical computer following modification of these vectors.

To illustrate this functionality, consider the following set of operations might be performed in operation of the analytical behavior method:
Search for the first EXE file in this directory ;set FindFirst Flag (Tstruct Structure)
Is this a PE executable (examine header)? ;set EXEcheck Flag
If not, jump far
Else: Open the executable file ;set EXEaccess Flag
Write to the section table ;set EXEwrite Flag
Search for the end-of-file ;set EXEeof Flag
Write to file ;set EXEwrite Flag
Close file
Search next EXE file ;set EXEFindNext Flag Bit+1 64                                                                 1

Returned 0010 0100 1010 1010 1001 0101 0010 1111 0010 1010 0010 0100 0100 1001 0000 0101
Value: 2 4 A A 9 5 2 F 2 A 2 4 4 9 0 5
Sequencer: 21,22, 23,24,26,29,3E,1,36,38,3B,3, 9,C,F,13, 16,1A,1C,1E, 2B,2D,30,32,34, The resulting behavior pattern is: 24AA952F2A244905

The behavior pattern contains flags that indicate that the user has not had the opportunity to interact with this process through user input (the userInput flag is not set). The sequencer contains the order in which the bits were set, identifying the infection sequence shown above. Therefore this observed behavior is most likely viral.

Many viruses are encrypted, polymorphic or use 'tricks' to avoid detection by signature scanners. Wherever such 'tricks' are used, the behavior pattern points more obviously towards a virus since such tricks are not normally used in normal applications. In any case, preferred implementations of the present invention require that an infection procedure be present to trigger a virus warning to avoid false positive warnings. Encrypted viruses are no problem, because the execution of the code within the virtual machine, which generates the behavior pattern, effectively decrypts any encrypted or polymorphic virus, as it would in a physical PC environment. Because all parts of the virtual computer are virtualized in preferred embodiments, and at no time is the virtualized program allowed to interact with the physical computer, there is no chance that viral code could escape from the virtual machine and infect the physical computer.

The change detection module compares existing files at 6 levels to determine if the file was analyzed previously:

The file is the same (entry point code, sample, file-name and file-size are the same).

The file is not in the database (new file).

The behavior pattern matches a stored pattern.

The file's entry code is modified. The behavior pattern is binary subtracted from the previous stored pattern. The resulting bit pattern is analyzed.

The file's entry code, CRC and header fields are the same, but the file is renamed. No other fields are modified.

The file's behavior pattern is found in the database and matches a known viral behavior pattern.

The file's behavior pattern is found in the database and matches a known benign behavior pattern.

The program is virtualized if the executable part of the file is modified. A file that does not contain modified executable code cannot contain a virus, unless the original file was infected. If this is the case, a previous analysis would have detected the virus. When an existing program is updated, its function remains the same, and therefore its behavior pattern closely matches its stored behavior pattern. If the altered bits indicate that an infection procedure has been added then the file is considered as infected.

Two detection mechanisms operate side-by-side, both using the behavior pattern:

Pre-infection detection

This is the most desirable case. In pre-infection detection, the behavior pattern is analyzed and is found to represent viral behavior for those new or modified programs introduced to the system. The program file under evaluation can be repaired by removing the virus or erased if the virus infection proves too difficult to remove or if parts of the original code were overwritten. The infected program has not yet been executed on the physical PC at this time and so nothing need be done to repair the physical PC after discovery of the virus.

Post-infection detection

Post-infection detection takes place in cases when initial infection is missed by pre-infection detection. A virus could be missed by pre-infection detection when it does not perform any viral function on first execution and does not modify interrupt vectors that point to an infection routine. This is the case with so-called slow infectors and similarly behaving malignant code. In post-infection detection the virus is caught the moment it attempts to infect the first executable on the PC. The file hook mechanism detects this attempted change to an executable (including documents). The ABM engine then analyzes the first executable program and finds that its behavior pattern is altered in a manner indicating that a virus is active.

Database Structure:

File ID area: Behavior pattern, program name, file size and path.

Repair Structures Header fields, section table and relocation tables.

Segment tables Size and Offset of each section in the section table (Windows programs only).

Macro viruses in documents are treated as if they were executables. The original "VISUAL BASIC" code is recovered by decryption (where applicable) and reverse compiling the "VISUAL BASIC" document (COM) stream. The resulting source code is neither saved nor shown to protect the rights of the original publishers of legitimate "VISUAL BASIC" software. After virtualization the source code is discarded.

One drawback to the described virus detection system is that the initial analysis is slower than pattern scanning. This drawback is more than offset by the advantages of the system. Using file system hooking means all new files are reported and analyzed 'on the fly' in background. This means that once a computer is virus-free, a complete scan is typically not required again, unless the protection system has been deactivated during a period in which new programs have been installed. In signature scanning based protection systems, the computer needs to be completely rescanned every time the virus signature database is updated. Unaltered files are not again virtualized when the user initiates subsequent disk scans, so that the process is at least as fast as pattern scanning, but with a higher degree of security. The stored information also helps to repair viral damage to files or system areas, securing complete or effectively complete recovery in most cases.

In tests of a prototype implementation ABM system, the combination of pre-infection (96%) and post-infection detection (4%) resulted in 100% detection of all known viral techniques, using a combination of new, modified and well-known viruses. Other methods detected only 100% of known viruses and scored as low as 0% for the detection of new, modified and unknown viruses. No exact figure can be quoted for tests involving signature scanner based products. The results for such products are a direct representation of the mix of known, modified and new, unknown viruses; e.g. if 30% of the virus test set is new, modified or unknown then the final score reflected close to 30% missed viruses. No such relationship exists for the implementations of preferred aspects of the present system, where the detection efficiency does not appreciably vary for alterations of the presented virus mix.

The present invention has been set forth with reference to certain particularly preferred embodiments thereof. Those of ordinary skill in the art will appreciate that the present invention need not be limited to these presently preferred embodiments and will understand that various modifications and extensions of these embodiments might be made within the general teachings of the present invention. Consequently, the present invention is not to be limited to any of the described embodiments but is instead to be defined by the claims, which follow.

I claim:

1. A method for identifying presence of malicious code in program code within a computer system, the method comprising:

initializing a virtual machine within the computer system, the virtual machine comprising a virtual personal computer (PC) implemented by software simulating functionality of a central processing unit and memory and a virtual operating system simulating functionality of a multi-threaded operating system of the computer system;

virtually executing a target program within the virtual PC so that the target program interacts only with an instance of the virtual operating system;

analyzing behavior of the target program upon completion of virtual execution to identify an occurrence of malicious code behavior based upon an evaluation by the virtual machine of a behavior pattern representing information about all functions simulated by the target program during virtual execution;

generating the behavior pattern for the target program by tracking functions performed and not performed by the target program with flags in a behavior pattern field and by tracking a sequence in which the functions are called by the target program with the behavior pattern field; and terminating the virtual PC after the analyzing process, thereby removing from the computer system a copy of the target program that was contained within the virtual PC.

2. The method of claim 1, wherein the virtual PC of the virtual machine simulates functionality of input/output ports, and the virtual operating system simulates functionality of operating system data areas and an operating system application program interface.

3. The method of claim 2, wherein virtual execution of the target program causes the target program to interact with the simulated operating system application program interface.

4. The method of claim 1, wherein the virtual operating system is operative to simulate an application program interface call of the operating system by returning a correct value to the call without completing actual performance of the call.

5. The method of claim 1, wherein the target program is newly introduced to the computer system and initially executed by virtually executing the target program on the virtual PC.

6. The method of claim 1, wherein after a first instance of the target program is analyzed by the virtual machine and a first behavior pattern is generated and stored in a database coupled to the computer system, the method further comprising:

determining that the target program is modified;

analyzing the modified target program by executing the modified target program in the virtual machine to provide a second behavior pattern; and comparing within the virtual machine the first behavior pattern to the second behavior pattern to determine whether the second behavior pattern is altered from the fist behavior pattern in a manner indicative of presence of the malicious code in the modified target program.

7. The method of claim 6, wherein a new behavior pattern is generated each time the target program is modified.

8. The method of claim 6, wherein introduction of the malicious code during modification of the target program is detected by comparing the first behavior pattern to the second behavior pattern and identifying altered bits indicating an addition of an infection procedure to the modified target program.

9. The method of claim 6, wherein the first behavior pattern is identified as a match to the second behavior pattern when the modified target program is a new version of the first program.

10. The method of claim 1, wherein the behavior pattern identifies functions executed in the virtual execution of the target program, the method further comprising tracking an order in which the functions are virtually executed by the target program within the virtual PC to provide a complete record of all functions simulated by the target program, as if the target program were executed on the computer system.

11. A method for identifying presence of malicious code in program code within a computer system, the method comprising:

initializing a virtual machine within the computer system, the virtual machine comprising software simulating functionality of a central processing unit and memory and a virtual operating system simulating functionality of a multi-threaded operating system of the computer system;

virtually executing a target program with the virtual machine so that the target program interacts with an instance of the virtual operating system rather than with the operating system of the computer system, whereby the malicious code is fully executed during virtual execution of the target program if the target program comprises the malicious code;

generating a behavior pattern for the target program by tracking functions performed and not performed by the target program with flags in a behavior pattern field and by tracking a sequence in which the functions are called by the target program with the behavior pattern field in order to collect information about all functions simulated by the target program during virtual execution; and terminating the virtual machine upon completion of the virtual execution of the target program, leaving behind a record of the behavior pattern that is representative of operations of the target program with the computer system, including operations of the malicious code if the target program comprises the malicious code.

12. The method of claim 11, wherein the record is in a behavior register in the computer system.

13. The method of claim 11, wherein after a first instance of the target program is analyzed by the virtual machine and a first behavior pattern is generated and stored in a database coupled to the computer system, the method further comprising:

determining that the target program is modified;

analyzing the modified target program by executing the modified target program with the virtual machine to provide a second behavior pattern; and comparing the first behavior pattern to the second behavior pattern to determine whether the second behavior pattern is altered from the first behavior pattern in a manner indicative of presence of the malicious code in the modified target program.

14. The method of claim 13, wherein a new behavior pattern is generated each time the target program is modified.

15. The method of claim 13, wherein introduction of the malicious code during modification of the target program is detected by comparing the first behavior pattern to the second behavior pattern and identifying altered bits indicating an addition of an infection procedure to the modified target program.

16. The method of claim 13, wherein the first behavior pattern is identified as a match to the second behavior pattern when the modified target program is a new version of the first program.

17. The method of claim 11, wherein the behavior pattern identifies all functions executed during the virtual execution of the target program and records an order of simulation of the functions.

18. A memory storage device comprising computer-executable steps for identifying the presence of malicious code in program code in a computer system, comprising:

initializing a virtual machine for the computer system, the virtual machine comprising a virtual personal computer (PC) implemented by software simulating functionality of a central processing unit memory a virtual operating system simulating functionality of a multi-threaded operating system of the computer system;

executing a target program within the virtual PC so that the target program completes a virtual execution by interacting only with an instance of the virtual operating system;

generating a behavior pattern by completing virtual execution of the target program within the virtual PC and by tracking functions performed and not performed by the target program with flags in a behavior pattern field and by tracking a sequence in which the functions are called by the target program, the behavior pattern representative of operational functions completed by the target program during virtual execution, including at least one of virtual operating system calls, Input/Output functions and program functions supported by the target program;

upon completion of virtual execution, operating the virtual machine to compare the behavior pattern generated by virtual execution of the target program to a behavior pattern representative of operations by the malicious code to identify an occurrence of malicious code behavior; and in the event that the comparison process results in a match representing an identification of malicious code behavior by the target program, then identifying the target program as comprising the malicious code.

19. The memory storage device of claim 18 further comprising the computer-executable step of removing the target program from the computer system in response to an identification of the target program comprising malicious code so that the target program cannot affect the performance of subsequent programs executed by the computer system.

20. A memory storage device comprising computer-executable steps for identifying the presence of malicious code in program code in a computer system, comprising:

executing a target program within a virtual personal computer (PC) so that the target program completes a virtual execution by interacting only with an instance of a virtual operating system, the virtual PC comprising software operative to simulate functionality of a processor and memory, the virtual operating system operative to simulate functionality of a multi-threaded operating system for the computer system, the virtual PC and the virtual operating system operating in combination to form a virtual machine;

collecting information about the behavior of the target program during virtual execution of the target program by the virtual machine by tracking functions performed and not performed by the target program with flags in a behavior pattern field and by tracking a sequence in which the functions are called by the target program in order to create a record of virtual operations of the target program, whereby the record reflects a plurality of operations of the malicious code if the target program comprises the malicious code;

upon completion of virtual execution of the target program, analyzing the record with the virtual machine to identify an occurrence of malicious code behavior by comparing the record to a behavior pattern representative of the operations performed by the malicious code; and in the event that the record matches the malicious code behavior, then identifying the target program as comprising the malicious code.

21. The memory storage device of claim 20 further comprising the computer-executable step of removing the target program from the computer system in response to an identification of the target program comprising malicious code so that the target program cannot affect performance of subsequent programs executed by the computer system.

22. A computer-implemented method for identifying a presence of malicious code in program code for a computer system, comprising the steps:

virtually executing a target program within a virtual machine comprising a virtual personal computer (PC) implemented by software operative to simulate functionality of a processor, and memory and a virtual operating system having software simulating functionality of a multi-threaded operating system for the computer system wherein virtual execution of the target program comprises interactions with an instance of the virtual operating system; creating a record of all functions simulated by the target program during virtual execution of the target program by the virtual machine, the record comprising a behavior pattern representative of the behavior of the target program as if it were executed on the computer system, the behavior pattern comprising characteristics of malicious code behavior in the event that the target program comprises the malicious code; and creating the behavior pattern by tracking functions performed and not performed by the target program with flags in a behavior pattern field and by tracking a sequence in which the functions are called by the target program with the behavior pattern field.

23. The computer-implemented method of claim 22 further comprising the step of operating the virtual machine to analyze the record after completion of the virtual execution by the target program to identify an occurrence of a type of the behavior pattern representative of operations by the malicious code.

24. The computer-implemented method of claim 23 wherein, in the event of an identification of an occurrence of malicious code behavior by the target program, the method further comprises the step of identifying the target program as comprising the malicious code.

25. The computer-implemented method of claim 24 further comprising the step of removing the target program from the computer system in response to an identification that the target program comprises the malicious code so that the target program cannot affect performance of subsequent programs executed by the computer system.

26. A memory storage device comprising computer-executable steps for identifying the presence of malicious code in program code in a computer system, comprising:

executing a target program within a virtual personal computer (PC) so that the target program completes a virtual execution by interacting only with an instance of a virtual operating system, the virtual PC comprising software operative to simulate functionality of a processor and memory, the virtual operating system operative to simulate functionality of a multi-threaded operating system for the computer system the virtual PC and the virtual operating system operating in combination to form a virtual machine;

collecting information about the behavior of the target program in response to virtual execution of the target program by the virtual machine;

in response to completing virtual execution of the target program, collecting information about interrupt call operations that call any interrupt service routine modified by the virtual execution of the target program;

creating a record by tracking functions performed and not performed by the target program with flags in a behavior pattern field and by tracking a sequence in which the functions are called by the target program with the behavior pattern field, the functions comprising the interrupt call operations, the record comprising the information collected about the virtual execution of the target program and the interrupt call operations that call any interrupt service routine modified by the virtual execution of the target program;

analyzing the record to identify an occurrence of malicious code behavior by comparing the record to a behavior pattern representative of the operations performed by the malicious code; and in the event that the record matches the malicious code behavior, then identifying the target program as comprising the malicious code.

27. The memory storage device of claim 26 further comprising the computer-executable step of removing the target program from the computer system in response to an identification that the target program comprises malicious code so that the target program cannot affect performance of subsequent programs executed by the computer system.

28. The memory storage device of claim 26, wherein the step of collecting information about the behavior of the target program in response to virtual execution of the target program comprises storing bits that correspond to the flags in a behavior pattern register the behavior pattern register providing memory for the behavior pattern field, the storing of the bits being completed in response to monitoring operating system calls, interrupts and I/O port read/write operations completed by the virtual machine.

29. A memory storage device comprising computer-executable steps for identifying the presence of malicious code in program code in a computer system, comprising:

initializing a virtual machine for the computer system, the virtual machine comprising a virtual personal computer (PC) implemented by software simulating functionality of a central processing unit and memory and a virtual operating system simulating functionality of a multi-threaded operating system of the computer system, the initializing step comprising the steps of extracting the file structure of a target program and loading the target program into the software-simulated memory of the virtual PC;

executing a target program within the virtual PC so that the target program completes a virtual execution by interacting only with an instance of the virtual operating system;

generating a behavior pattern by completing virtual execution of the entire code of the target program within the virtual PC and by tracking functions performed and not performed by the target program with flags in a behavior pattern field and by tracking a sequence in which the functions are called by the target program, the behavior pattern representative of a sequence of operational functions completed by the target program during virtual execution, including at least one of virtual operating system calls, Input/Output functions and program functions supported by the target program;

upon completion of virtual execution, operating the virtual machine to compare the behavior pattern generated by virtual execution of the target program to a behavior pattern representative of operations by the malicious code to identify an occurrence of malicious code behavior; and in the event that the comparison process results in a match representing an identification of malicious code behavior by the target program, then identifying the target program as comprising the malicious code.

30. The memory storage device of claim 29 further comprising the computer-executable step of removing the target program from the computer system in response to an identification that the target program comprises malicious code so that the target program cannot affect performance of subsequent programs executed by the computer system.

31. The memory storage device of claim 29, further comprising the computer-executable steps of:

identifying a new instance of the target program;

determining that the new instance of the target program represents a modified version of the target program;

analyzing the modified target program by executing the modified version of the target program in the virtual machine to provide a supplemental behavior pattern; and comparing within the virtual machine the behavior pattern to the supplemental behavior pattern to determine whether the supplemental behavior pattern is altered from the behavior pattern in a manner indicative of presence of the malicious code in the modified version of the target program.

32. The memory storage device of claim 29, wherein another supplemental behavior pattern is generated each time the target program is modified.

33. The memory storage device of claim 29, wherein the malicious code is detected by comparing the behavior pattern to the supplemental behavior pattern and identifying altered bits indicating an addition of an infection procedure to the modified version of the target program.

34. The memory storage device of claim 29, wherein the behavior pattern is identified as a match to the supplemental behavior pattern when the modified version of the target program is a new version of the first program.

* * * * *

UNITED STATES PATENT AND TRADEMARK OFFICE
CERTIFICATE OF CORRECTION

PATENT NO. : 7,093,239 B1
APPLICATION NO. : 09/642625
DATED : August 15, 2006
INVENTOR(S) : Peter A. J. van der Made It is certified that error appears in the above-identified patent and that said Letters Patent is hereby corrected as shown below:

Claim 6, column 13, line 44, "fist behavior pattern in a manner indicative of presence" should read -- first behavior pattern in a manner indicative of presence --

Signed and Sealed this

Twenty-sixth Day of December, 2006

JON W. DUDAS
*Director of the United States Patent and Trademark Office*